No. 717,470. Patented Dec. 30, 1902.
J. H. SWIFT.
HOOK FOR ORNAMENTAL CHAINS.
(Application filed May 17, 1902.)
(No Model.)

WITNESSES,
John S. Lynch
Andrew J. Peters

INVENTOR,
Joseph H. Swift
BY S. Schofield
ATT'Y.

UNITED STATES PATENT OFFICE.

JOSEPH H. SWIFT, OF NORTH ATTLEBORO, MASSACHUSETTS.

HOOK FOR ORNAMENTAL CHAINS.

SPECIFICATION forming part of Letters Patent No. 717,470, dated December 30, 1902.

Application filed May 17, 1902. Serial No. 107,855. (No model.)

*To all whom it may concern:*

Be it known that I, JOSEPH H. SWIFT, a citizen of the United States, residing at North Attleboro, in the State of Massachusetts, have invented a new and useful Improvement in Hooks for Ornamental Chains, of which the following is a specification.

The object of my invention is to make a wire hook of very simple construction which will present a desirable appearance and be strong and durable and which may be employed as a connecting-hook on ornamental chains; and my invention consists in the improved construction of the hook whereby the above-mentioned advantages may be secured, as hereinafter set forth.

Figure 1:
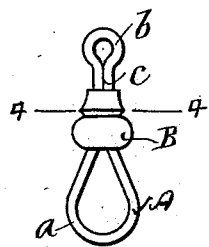
Figure 2:
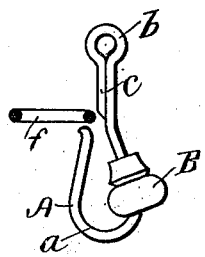
Figure 4:
Figure 3:
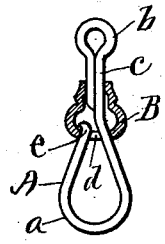
Figure 5:
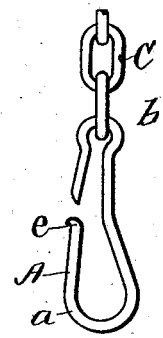

In the accompanying drawings, Figure 1 represents the side view of a hook embodying my improvement, showing the closed condition of the hook. Fig. 2 represents the same in its opened condition. Fig. 3 represents a longitudinal section of the sliding sleeve. Fig. 4 represents a transverse section taken in the line 4 4 of Fig. 1. Fig. 5 represents a side view of the hook, showing the method of attaching the same to the end link of the ornamental chain.

In the drawings, A represents the hook, which is formed of half-round wire in one piece of stock and bent to form the hook portion $a$, the holding-eye $b$, and the cylindrical shank $c$, and upon the shank $c$ is placed the sliding catch-sleeve B, the edge $d$ of the said sleeve being adapted for engagement with the end $e$ of the hook, as shown in Fig. 3. In Fig. 1 the hook is shown in its closed and in Fig. 2 in its opened condition, the sleeve B being in the latter case removed from the shank $c$ to the hook portion $a$ preparatory to the insertion of the ring $f$ upon the hook, after which the sleeve B is to be returned to the shank $c$ and engaged with the end of the hook, as shown in Fig. 3, and when the ring is to be disengaged then by pressing inward upon the hook its yielding resilience allows it to be freed from the sleeve, so that the ring $f$ may be removed therefrom. When the hook A is to be connected to the chain C, the wire of the shank $c$ may be opened out, as shown in Fig. 5, and a link of the chain inserted, after which the wire of the shank is to be closed together, so as to receive the sleeve B.

I claim as my invention—

The combination of the hook made in one piece of half-round wire, bent upon itself to form the hook portion, the holding-eye, and the cylindrical shank, with the sliding sleeve adapted to cover the end of the hook, substantially as described.

JOSEPH H. SWIFT.

Witnesses:
SOCRATES SCHOLFIELD,
ANDREW J. PITCHER.